(12) United States Patent
DeLisle

(10) Patent No.: US 7,513,489 B2
(45) Date of Patent: Apr. 7, 2009

(54) ANTI-DETONATION FUEL DELIVERY SYSTEM

(76) Inventor: Gilles L. DeLisle, 2617 Mesilla Hills Dr., Las Cruces, NM (US) 88005

( * ) Notice: Subject to any disclaimer, the term of this patent is extended or adjusted under 35 U.S.C. 154(b) by 171 days.

(21) Appl. No.: 10/549,726

(22) PCT Filed: Jan. 27, 2004

(86) PCT No.: PCT/US2004/002186

§ 371 (c)(1), (2), (4) Date: Sep. 19, 2005

(87) PCT Pub. No.: WO2004/094810

PCT Pub. Date: Nov. 4, 2004

(65) Prior Publication Data

US 2006/0175719 A1 Aug. 10, 2006

Related U.S. Application Data

(63) Continuation-in-part of application No. PCT/US03/08635, filed on Mar. 19, 2003.

(51) Int. Cl.
*F02M 19/03* (2006.01)
(52) U.S. Cl. ............... 261/78.1; 123/478; 261/78.2; 261/79.1; 261/79.2; 261/142; 261/144; 261/DIG. 55; 261/DIG. 83; 366/340
(58) Field of Classification Search ............... 261/76, 261/78.1, 78.2, 79.1, 79.2, 81, 89, DIG. 55, 261/DIG. 75, DIG. 83, 127, 142, 144; 366/340; 123/478
See application file for complete search history.

(56) References Cited

U.S. PATENT DOCUMENTS

| 1,382,285 A | * | 6/1921 | Harris | 123/556 |
| 1,874,002 A | * | 8/1932 | Fantz | 239/403 |
| 1,885,559 A | * | 11/1932 | Smith | 48/189.4 |
| 3,326,538 A | * | 6/1967 | Merritt | 261/28 |
| 3,334,657 A | * | 8/1967 | Smith et al. | 137/888 |
| 3,336,017 A | * | 8/1967 | Kopa | 261/128 |
| 3,388,868 A | * | 6/1968 | Watson et al. | 239/427 |
| 3,393,984 A | * | 7/1968 | Wisman | 48/189.4 |
| 3,544,290 A | * | 12/1970 | Larson, Sr. et al. | 48/189.5 |

(Continued)

FOREIGN PATENT DOCUMENTS

CN 1 143 728 2/1997

(Continued)

*Primary Examiner*—Richard L Chiesa
(74) *Attorney, Agent, or Firm*—Mark Clodfelter

(57) ABSTRACT

Apparatus sealably incorporating a fuel metering device and fuel processing device [200, 200a, 200b] for producing a stabilized fog of fuel droplets sized 50 microns and less that when mixed with combustion air burn completely, reduce or eliminate detonation (knock) in internal combustion engines and reduce fuel octane requirements. The apparatus [200, 200a, 200b] may include a carrier gas reservoir [216, 216a] closed to external carrier gasses. A heater [205] may be employed to flash into vapor a portion of the liquid fuel to develop a carrier gas. In embodiments for jet or turbine engines, bleed gas from the engine may be used to provide carrier gas through a fuel processor [254], or the fuel may be heated-by-heater [260] to flash some of the fuel into vapor to provide carrier gas through the fuel processor to produce the stabilized fog of fuel droplets.

30 Claims, 10 Drawing Sheets

U.S. PATENT DOCUMENTS

| | | | | |
|---|---|---|---|---|
| 3,664,818 | A * | 5/1972 | Kramer | 48/180.1 |
| 3,981,946 | A * | 9/1976 | Soya et al. | 261/64.3 |
| 4,044,077 | A * | 8/1977 | Gupta | 261/23.2 |
| 4,080,700 | A | 3/1978 | Muller | |
| 4,092,966 | A * | 6/1978 | Prosen | 48/189.4 |
| 4,106,459 | A * | 8/1978 | Asai et al. | 123/439 |
| 4,123,481 | A * | 10/1978 | Herold et al. | 261/81 |
| 4,176,634 | A * | 12/1979 | Martin | 123/590 |
| 4,177,780 | A * | 12/1979 | Pellerin | 123/590 |
| 4,244,821 | A * | 1/1981 | Molvar | 210/220 |
| 4,307,697 | A * | 12/1981 | Ong | 48/189.4 |
| 4,359,997 | A * | 11/1982 | Lyssy | 123/592 |
| 4,370,304 | A * | 1/1983 | Hendriks et al. | 422/224 |
| 4,399,794 | A * | 8/1983 | Gagnon | 123/523 |
| 4,443,335 | A * | 4/1984 | Gullace | 210/220 |
| 4,487,553 | A * | 12/1984 | Nagata | 417/171 |
| 4,515,734 | A * | 5/1985 | Rock et al. | 261/50.1 |
| 4,568,500 | A * | 2/1986 | Rock et al. | 261/50.1 |
| 5,054,688 | A * | 10/1991 | Grindley | 239/407 |
| 5,113,945 | A * | 5/1992 | Cable | 169/15 |
| 5,431,346 | A | 7/1995 | Sinaisky | |
| 5,472,645 | A * | 12/1995 | Rock et al. | 261/79.1 |
| 5,480,589 | A * | 1/1996 | Belser et al. | 261/76 |
| 5,512,216 | A * | 4/1996 | Rock et al. | 261/79.1 |
| 5,672,187 | A * | 9/1997 | Rock et al. | 95/219 |
| 6,010,083 | A * | 1/2000 | Roe et al. | 239/427.5 |
| 6,113,078 | A * | 9/2000 | Rock | 261/21 |
| 6,283,460 | B1 * | 9/2001 | Omarsson | 261/50.1 |
| 6,540,210 | B2 * | 4/2003 | Satterfield | 261/62 |
| 6,736,376 | B1 * | 5/2004 | DeLisle | 261/79.1 |
| 7,093,826 | B2 * | 8/2006 | DeLisle | 261/78.1 |
| 7,111,829 | B2 * | 9/2006 | DeLisle | 261/78.1 |
| 7,111,830 | B2 * | 9/2006 | DeLisle | 261/79.1 |

FOREIGN PATENT DOCUMENTS

| | | | | |
|---|---|---|---|---|
| GB | | 2083554 A * | 3/1982 | 261/79.1 |
| WO | WO 97/48897 A * | | 12/1997 | |

* cited by examiner

ANTI-DETONATION FUEL DELIVERY SYSTEM

CROSS REFERENCE TO RELATED APPLICATIONS

This application is a continuation-in-part of pending PCT application number PCT/US03/08635, filed 19 Mar. 2003, which claims priority from pending U.S. patent application Ser. No. 10/101,250, filed 19 Mar. 2002.

FIELD OF THE INVENTION

This invention relates generally to fuel delivery systems, and particularly to a fuel delivery system including a fuel nozzle incorporating a closed STAR TUBE™, the system providing a fog of fuel droplets sized 50 microns and less, and predominantly in the 10-30 micron range, while minimizing vapor formation.

BACKGROUND OF THE INVENTION

A large number of methods for producing fuel-air mixtures for reciprocating internal combustion engines, such as Otto cycle engines, Diesel engines, 2-stroke engines, Wankel-type engines and any other compression-type engine are well known, and many are patented. However, as far as Applicant is aware, many previously disclosed methods, except Diesel and jet engines, attempt to produce a fuel vapor mixed thoroughly with air. In many of these methods, fuel is heated, in some instances to near a boiling point of the fuel, in order to convert the fuel to a gas prior to its induction into a combustion chamber. Virtually all attempt to minimize fuel droplet production and maximize fuel vapor production based on the belief that fuel droplets in the fuel/air mixture cause inefficient combustion, and generate more pollutants in the exhaust. In most engines, fuel spray from a carburetor or fuel injector is simply sprayed into an intake manifold of the engine.

In gasoline engines, one major drawback to providing a stochiemetric fuel/air mixture wherein the fuel is in a vapor form is that the vapor provides a readily explosive mixture. This becomes a problem when loading on an engine causes pressures in the combustion chambers sufficient to raise a temperature of the fuel/air mixture to or beyond its flash point. This in turn causes the fuel/air mixture to explode all at once (rather than burning evenly in an outward direction from the spark plug), a condition commonly known as "ping", or in older, worn engines "knock", due to the knocking noise created as bearings of the piston connecting rods are slammed against the crankshaft under the force of the explosion. As might be imagined, such a condition is deleterious to bearings and other parts of the engine, and can greatly shorten engine life. For purposes of this application, both ping and knock are used to refer to a detonation of the fuel vapor/air mixture in a manner similar to an explosion rather than a controlled burn.

Where gasoline is simply sprayed into an engine manifold, as from a carburetor or fuel injector, droplets of all sizes enter the combustion chamber. Here, Applicant has discovered that fuel droplets larger than about 50 microns or so do not burn completely, creating unburned hydrocarbon pollutants. With respect to Diesel and jet fuel, incomplete burning also produces carbon particulate pollution in addition to gaseous hydrocarbon pollution.

In accordance with the present invention wherein a fog of size-limited fuel droplets of about 50 microns and less predominantly make up the fuel component of the fuel/air mixture, apparatus is provided that processes metered quantities of fuel delivered by a fuel injector, fuel valve (or other nozzle) or any other fuel metering device into an aerosol fog having droplets less than 50 microns in diameter and with a minimum of vapor. As stated, the object of this invention is to cause internal combustion engines such as Otto-cycle engines, Diesel engines, two-stroke engines, Wankel-type engines and other, such engines that compress an air/fuel mixture to operate more efficiently, with less pollution and without knock than has heretofore been possible. It has been discovered that fuel droplets of about 50 microns and less in diameter burn at a slower rate than a fuel vapor/air mixture that explodes, but significantly faster than the larger liquid fuel droplets delivered by conventional fuel delivery systems currently in use. In addition, it has been found that these smaller fuel droplets, when thoroughly mixed with air, burn more stoichiometrically than larger fuel droplets. It is believed a larger fuel droplet depletes the surrounding microenvironment of oxygen before burning completely, thus creating the unburned hydrocarbon pollutants found in exhaust gases. In contrast, fuel droplets smaller than about 50 microns in diameter consume surrounding oxygen in a stoichiometric relation when burned because of their extremely small size, thus the net fuel/air charge in a combustion chamber is burned completely, rapidly and with little to no hydrocarbon pollutants. It is also believed that since, in one embodiment of the instant invention, fuel is initially sprayed into a generally confined tube (designated as a STAR TUBE™ for purposes of this application) containing turbulence-inducing devices, vapor saturation of air within the tube prevents further evaporation of the fuel droplets, causing the fuel droplets to be reduced in size mechanically rather than by evaporation as the fuel droplets travel through the tube. Here, as the fuel, and particularly with respect to gasoline and other volatile fuels, is released from pressure of the fuel rail and exposed to the partial vacuum created by the downward travel of a nearby piston via the open intake valve, lighter, more volatile components of the fuel instantly evaporate and increase hydrocarbon vapor pressure within the tube, suppressing further evaporation of the fuel droplets. In addition, cooling due to rapid expansion of the evaporating lighter components of the fuel cools and stabilizes the fuel droplets within the closed environment within the STAR TUBE™. The fuel is then processed mechanically by turbulence-inducing devices in the STAR TUBE™ until the droplets reach a size sufficiently small so as to travel with a localized region of fuel-saturated air to the combustion chamber. The fuel/air mixture is thoroughly mixed as it passes the intake valve and compressed in the combustion chamber, causing a rapid, even burning of the fuel.

In addition to the foregoing, it is also well known that when a cold engine is started, only about ⅕ of the fuel is burned. Only after the engine warms does it become possible to burn the fuel stoichiometrically. During the warm-up period, the quantity of unburned hydrocarbon pollutants produced by the engine are much greater than in a warm engine. Applicant's system for fuel processing also greatly reduces such pollutants developed by a cold engine by providing an air/fuel mixture that burns readily and completely.

Engines such as Diesel or other direct injection engines may also benefit from fuel processed into droplets sized 50 microns and less. Here, an aerosol fog of Diesel fuel having droplets of 50 microns and less will burn faster and ignite easier than a fuel spray of larger droplets, this fuel fog increasing efficiency and reducing unburned hydrocarbon pollutants and particulates in the exhaust of Diesel-type engines. Also, such combustion properties allow a more stoichiometric proportion of Diesel fuel/air to be used. Similarly, turbine and other jet engines, which typically are sources of unburned hydrocarbon pollution and particulates because of poor fuel management, particularly in afterburner modes of operation, may also benefit by fuel provided as a fog of droplets sized 50 microns and less. These droplets burn faster and/are ignited easier than would otherwise be the case. This allows more of a stoichiometric combustion of the jet fuel, reduces particulates and hydrocarbon pollutants in the exhaust gas, increases the efficiency the engine and may even prolong life of a jet engine.

In accordance with the foregoing, it is one object of the invention to provide a fuel delivery system that processes fuel into a fuel fog having fuel droplets of a maximum predetermined size. It is another object of the invention to provide apparatus for generating a fuel/air mixture wherein the fuel is incorporated into a fog of droplets sized 50 microns and less to as great an extent as possible, with as little vapor as possible. It is yet another object of the invention to provide a closed STAR TUBE™ and fuel injector or other fuel nozzle as a single integral unit or assembly sized so as to be as direct a replacement as possible for a conventional fuel injector. Other objects of the invention will become apparent upon a reading of the following appended specification.

DETAILED DESCRIPTION OF THE DRAWINGS

The basic principle of operation of the present invention involves providing a fuel fog having fuel droplets of a maximum predetermined size of from about 50 microns or so in diameter down to just larger than sub-micron clumps of fuel generally considered to be vapor. While in some fuels, such as gasoline, formation of some vapor cannot be avoided due to high volatility of the lighter components of the fuel, it is believed one feature of Applicant's system minimizes fuel vapor formation and keeps the fuel in droplet form to as great an extent as possible by creating a cooled fuel vapor-saturated region within which the fuel fog is transported, the cooling and saturation of the region stabilizing the fuel fog and preventing further evaporation of the fuel droplets. In this form, droplets of a fog are known to be particularly stable, with diffusion being the primary way droplets dissipate. Here, surface tension of the fuel droplets in such a fuel fog is believed to also contribute to prevent evaporation and dissipation of the fuel droplets until the droplets are burned.

Figure 1:
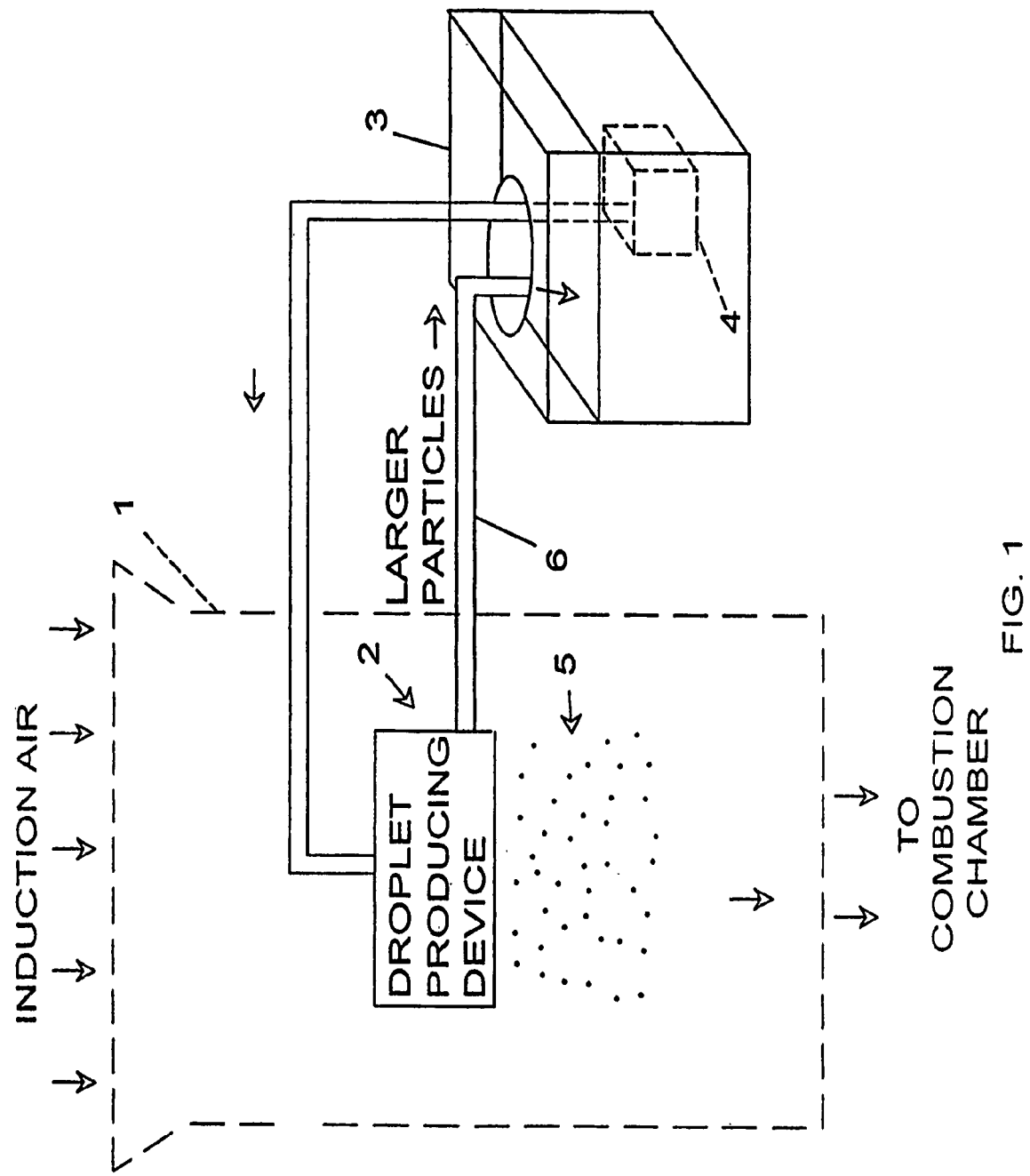
FIG. 1 is a diagrammatic view of the fuel delivery system of the present invention in its operating environment.
Figure 1A:
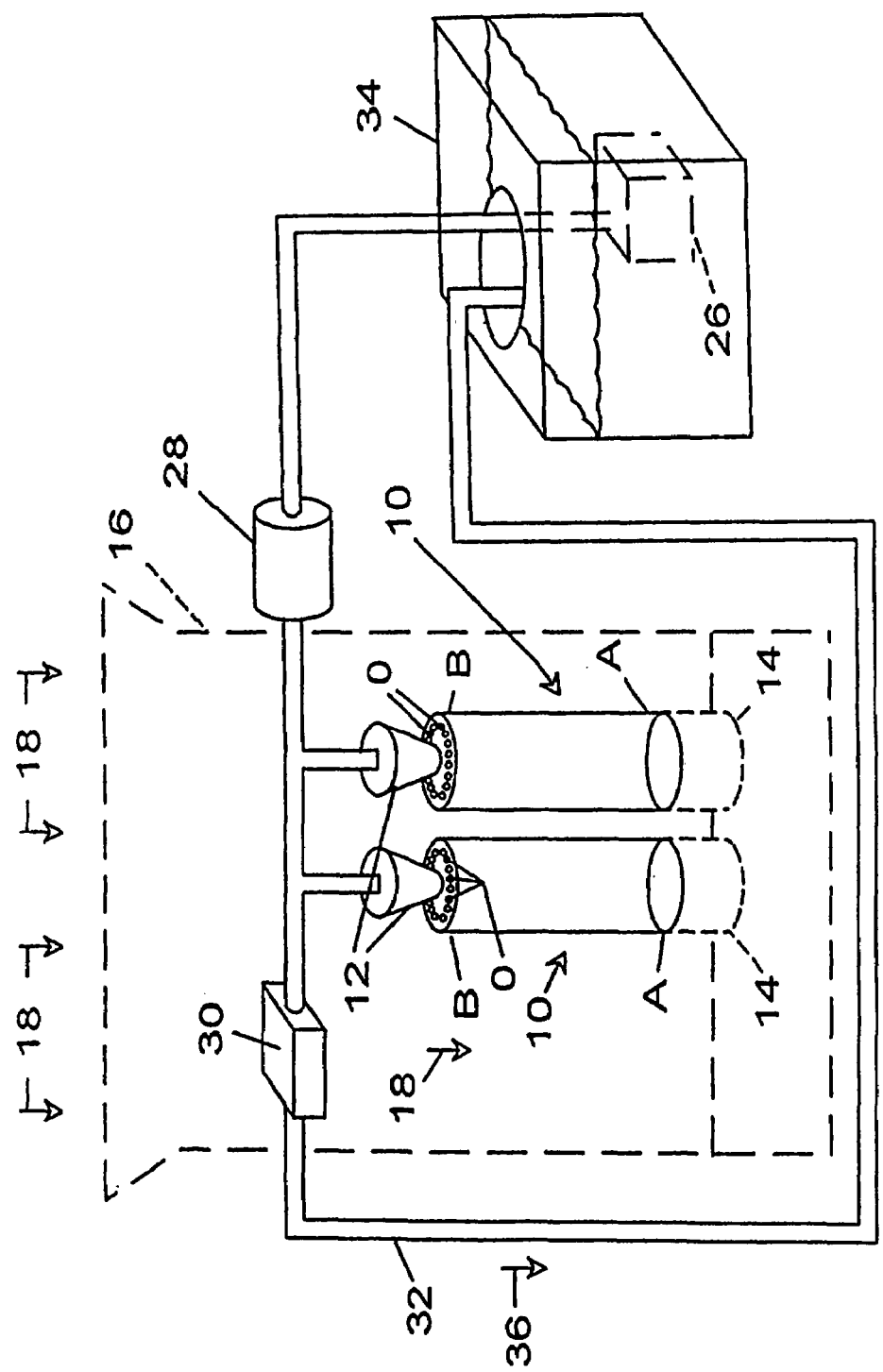
FIG. 1a is a diagrammatic view showing particulars of construction related to a different embodiment of the present invention.

In a most basic embodiment of the invention, and as shown in FIG. 1, a throttle body or intake manifold 1 is provided with any device 2 capable of receiving liquid fuels from a fuel tank 3 and associated fuel pump 4 and processing the fuel into droplets about 50 microns and less in diameter. The droplets as a fog to an induction air flow of an internal combustion engine or any other device, such as a space heater or stove, that beneficially may use fuel in such a form. Droplets larger than about 50 microns or so may be returned to tank 3 via line 6. Such oversize droplets may be isolated by centrifugal force in a vortex or other controlled flow path, or screens having a mesh sized to pass the smaller droplets but trap the larger droplets may also be used. As stated, it has been found that a fog of fuel droplets of 50 microns and less burns faster and cleaner than a spray as provided by a conventional fuel injector or carburetor, but yet in a controlled manner. In fact, such a fuel fog unexpectedly prevents detonation of lower octane fuels in higher compression engines requiring higher octane fuels, as will be further described.

Pursuant to Applicant's system, devices other than Applicant's specific apparatus may be used to generate a fuel fog, such as piezoelectric atomizers, ceramics sieves receiving pressurized fuel, specialized nozzles such as SIMPLEX™ nozzles and LASKIN nozzles, air pressure atomizers, rotary cup atomizers, ink jet-like devices that operate using ink jet or bubble jet technologies, insecticide spray nozzles and other nozzles such as nozzles from CHARGED INJECTION CORP. of New Jersey. These alternate devices may be incorporated into a throttle body or intake manifold, either with or without a STAR TUBE™ of Applicant's design. In addition, devices such as the NEBUROTOR™ available from IGEBA GERAETEBAU CORP. of Germany may also be used. This device uses a motor-driven rotating blade to break the liquid fuel into droplets of the desired predetermined size. However, it is probably desirable to generate the fuel fog in a closed environment so as to take advantage of vapor saturation and cooling of the environment within which the fuel fog is created. As such, these devices may be mounted within some form of tube or housing communicating with the induction air flow. Further, other applications of Applicant's STAR TUBE™ include spray painting, spraying insecticides, herbicides or fertilizer, powder coating applications and other applications wherein it is desired to break a liquid into droplets of a relatively uniform, predetermined size. Furthermore, such creation of a fog of droplets may be advantageously accomplished in combination with a gas used as a carrier or vehicle to transport and process the droplets through a STAR TUBE™. One example of such a process is wherein a product is formed from binary compounds, with one of the compounds being a liquid and the other being a gas or vapor. Here, using Applicant's STAR TUBE™, mixing of the two compounds occurs almost instantly and in an extremely uniform manner. Such an application may be useful in drug manufacture where a liquid precursor for a drug is treated with a gas, such as hydrogen or oxygen. In this application the gas and liquid precursor may be applied through a STAR TUBE™ in a stoichiometric proportion, as contrasted to currently used methods where the gas is simply bubbled up through a solution containing the liquid precursor.

Droplet sizes produced by Applicant's STAR TUBE™ were measured by a test rig wherein a STAR TUBE™ as disclosed herein and an associated fuel injector was set up in a simulated throttle body constructed of a transparent material. A suction device was used to draw air through the simulated throttle body at a rate representative of induction air flow. Conventional laser interferometry equipment, such as that used to measure size of pesticide droplets, was used to measure size of the fuel droplets as they exited the STAR TUBE™. As stated, a maximum fuel droplet size was found to be approximately 50 microns, with most of the droplets being in the 10-30 micron range.

In one particular embodiment of the instant invention, and by way of example, part of the induction air flow through an intake manifold of an engine may be diverted and utilized to process fuel sprayed by one or more fuel injectors into droplets sized 50 microns and less to provide the fuel fog. This embodiment uses two or more discs, with five discs for each STAR TUBE™ performing best to develop a fog having droplet sizes predominately in the range of 10 to 30 microns or so, with 50 microns being the maximum size. Each disk has a central opening, with a series of slits or vanes radially extending away from the central opening and each vane angularly positioned to spin the diverted induction air flow and fuel droplets. Slits between the vanes converge with distance from the central opening, forcing the air and fuel droplets in a flow path through the central opening and slits between the vanes. For purposes of this application, these plates are variously enumerated as Star Spin and Shear plates, or simply Star plates. Also, while some retrofit embodiments disclosed herein utilize conventional fuel injectors or similar devices, it should be apparent that a fuel injector is simply a metering valve for liquid fuel, and any fuel metering device for providing selected quantities of fuel may be substituted for a fuel injector and used in conjunction with Applicant's STAR TUBE™.

Here, a fuel injector may be replaced by any other fuel-management device, such as a cam activated piston, a solenoid activated piston, or a variable speed fuel pump. Such a fuel pump may be particularly applicable to a turbine or other type jet engine. Also, any of the aforementioned devices may be used alone to develop a fuel fog for mixing with intake air flow for combustion in an internal combustion engine, and advantageously should be mounted in an enclosure communicating with the induction air flow so as to saturate and cool the environment within which the fuel fog is created.

The vanes of Star plates create turbulence in the flow path, causing mechanical breakup of the fuel into smaller droplets. Within these combined actions, the spinning or spiral path creates centrifugal force on the fuel droplets, forcing them radially outward in the STAR TUBE™ where they pass through narrower portions of the slits between the vanes were turbulence is greater, tearing the larger droplets into smaller droplets. As the droplets become successively smaller as they pass through and by each Star plate, it is believed that the centrifugal and shearing forces overcomes surface tension in the liquid fuel droplets until an equilibrium point between the centrifugal and shearing forces and surface tension of the droplets is reached. Thus, the mixture may have an induced spin about the axis of the STAR TUBE™, as well as turbulent spin from passing through the vanes. After exiting the STAR TUBE™, the resulting aerosol fog is provided to the rest of the induction air stream and the fuel-air mixture is drawn into a combustion chamber.

In addition, and with respect to gasoline-fed engines, the gasoline used in an engine utilizing fuel injectors is provided to the fuel injectors under a significant amount of pressure, typically in the 30 PSI range. Within the STAR TUBE™, some of the lighter components of gasoline, such as pentane and hexane, and to some extent heptane, flash into a vapor when released from the pressure of the fuel rail and become exposed to the manifold vacuum. This provides cooling to the environment within the STAR TUBE™ during operation. Such cooling retards further evaporation of the fuel droplets, and stabilizes the fuel fog as it passes through the STAR TUBE™. Such cooling is believed to be greater than would otherwise be obtainable with a conventional fuel injector by itself, because such a conventional fuel injector provides a spray of fuel with much larger droplets that evaporate less, and in an open environment, as contrasted to the generally closed environment of a STAR TUBE™. While some cooling of the fuel fog is believed to be beneficial at normal operating temperatures, in cold weather the fuel, particularly heavier fuels such as Diesel fuel, may need to be heated in order to flow properly or provide a carrier gas, as will be further explained. Also, the fuel may be heated until an engine reaches its normal operating temperature, which assists in reducing pollutants developed by cold engines.

As stated, the method and apparatus described herein creates a stable fuel fog that allows a gasoline fuel with a lower octane rating to unexpectedly be used without knock in a high compression engine that otherwise would require a higher octane fuel. In the instant invention, and with respect to gasoline, it is believed the extent to which knocking of an engine is reduced or eliminated is dependent largely on the extent to which fuel droplet size is controlled. Also as stated, fuel droplets larger than about 50 microns or so burn in an oxygen-starved microenvironment, causing loss of power along with production of hydrocarbon byproducts characteristic of a "rich" fuel condition. On the other hand, if too much vapor is developed, the vapor may spontaneously detonate (knock) due to increased engine compression as the engine is loaded or if the compression ratio of the engine is higher than specified for the octane rating of the fuel. As stated, empirically derived results have demonstrated that an acceptable fuel droplet size for a sparked ignition engine is 50 microns and less in diameter down to just greater than the submicron clumps of fuel generally considered to be vapor. Within this range, a droplet size of between about 10-30 microns or so appears to be optimal.

In an engine equipped with Applicant's STAR TUBEs™" and where exhaust gases are closely monitored by a conventional engine controller, the more complete, faster and efficient burning caused by the STAR TUBEs™ causes the engine controller to provide close stoichiometric fuel/air charges. In contrast, conventional fuel injectors or carburetor-type devices that provide a fuel spray containing droplets of larger sizes results in unburned hydrocarbons in the exhaust gases that in turn causes the engine controller to reduce fuel in the fuel air charges, creating a lean, less than stoichiometric mixture that causes the engine to not produce rated power.

In these modern engines that have a computer and sensor system to monitor exhaust gas products to determine quantity of fuel to be provided to the induction air, addition of any of the aforementioned gases or vapors via the STAR TUBE™ to induction air is compensated for by the engine controller in order to keep the fuel/air mixture at a close stoichiometric proportion. Further, in the instance where there is a fuel injector for each combustion chamber, an aftermarket or OEM manifold may be provided with provisions to house the fuel injectors and a respective STAR TUBE™ in a position proximate a respective intake port of a combustion chamber, with possibly an air scoop or independent induction air channel cast or mounted in the interior of the intake manifold to direct an appropriate proportion of induction air through the STAR TUBE™. Alternately, an amount of gas or vapor serving as a carrier gas may be controlled, as by a computer such as an engine controller, to maintain or assist in maintaining a close stoichiometric fuel/air mixture or to increase or decrease a flow of motive gas through the STAR TUBE™ to compensate for changes in induction air flow, as when the accelerator pedal is depressed to a greater or lesser degree. Also, mechanical linkages coupled to valving apparatus may be employed for such increases and decreases in the motive flow through the STAR TUBE™.

In gasoline engines specifically designed as "lean burn" engines, excess air is mixed in the fuel/air charge. In these engines, the fuel fog consisting of droplets 50 microns and less burns more rapidly and more completely than would otherwise be the case. Thus, with STAR TUBES(™), these engines operate more efficiently and produce less pollution, and with little or no detonation.

As described herein, FIG. 1*a* illustrates, by way of example, one possible embodiment of a STAR TUBE™ 10. The STAR TUBE™ 10 is mounted between a conventional fuel injector 12 and injection port 14 in a throttle body 16 (dashed lines) or in a port of an intake manifold of an internal combustion engine near a respective intake valve, or in the case of a two-stroke engine an intake port. Conventionally, a fuel injector 12 is fitted to injection port 14 so as to provide a spray of fuel to induction air, as indicated by arrows 18, flowing through the throttle body and intake manifold. As shown, one end B of STAR TUBE™ 10 is configured as a fuel injector port to receive the injection end of a fuel injector 12, with the other end A of the STAR TUBE™ configured as a fuel injector tip so as to be mountable in the fuel injection port 14 that otherwise would receive the fuel injector. In some currently manufactured engines, there is more than one fuel injector mounted in respective ports of a throttle body, the throttle body providing fuel to all the cylinders of the engine. In this instance, there is a STAR TUBE™ for each respective injector. A portion of the induction air 18 flowing through the throttle body (or intake manifold) 16 enters openings O in end B of the STAR TUBE™ to create a carrier flow of gas that develops turbulence and shearing forces as described in order to break up the fuel droplets into a fog. In other engines where there is a fuel injector and corresponding injection port for each combustion chamber, these ports are typically located in the intake manifold proximate to a respective intake port or valve, with the fuel injector body mounted outside the intake manifold. Here, and as stated, the STAR TUBE™ may be configured at this end A as a fuel injector to fit the fuel injector port, and be configured at the other end B as a fuel injector port so as to receive the injecting end of a fuel injector. In this instance, a portion of the induction air may be directed and routed through the STAR TUBE™ so as to create a motive airflow therethrough, or a carrier gas may be provided independently of the induction air flow. This carrier gas may be separate from the induction airflow, and may be an inert gas such as dry nitrogen or filtered atmospheric gases, or a combustible gas such as propane or butane. Where propane and butane are used as a carrier gas, an octane rating of a fuel/air charge containing a liquid fuel of a low octane rating is beneficially increased due to the higher octane ratings of propane and butane. In other embodiments, the carrier gas may be or include an oxidizing gas such as nitrous oxide, which may be supplied through the STAR TUBE™, this flow being of a sufficiently high rate so as to generate turbulence to mechanically break the fuel droplets into smaller droplets having a size within the predetermined range as described above, and expel the fuel particles from the STAR TUBE™. When a motive flow of gas is provided from an external source, the gas flow may be continuous, or pulsed ON and OFF by using the ON-OFF signals provided to the fuel injectors, possibly with a short delay to allow the fuel droplets to clear the STAR TUBE™. Likewise, the portion of induction air flow may be switched ON and OFF corresponding with the fuel bursts from the fuel injectors.

As shown in the embodiment of FIG. 1*b*, a supply of gas 22 may be coupled to closed STAR TUBEs™ via a metering valve 24 and may be energized ON and OFF responsive to signals to the fuel injectors. An annular hollow collar 20 receives the gas from valve 24, and may be simply left open on a bottom side thereof, or may be provided with interior openings O that communicate with an upper interior end of the STAR TUBE™. An injector 12 sealably fits in the opening of the annular collar 20 and communicates with an interior of the STAR TUBE™. As stated, valve 24 may be operated to release a burst of gas in conjunction with the fuel injector being energized to release a spray of fuel. In other instances, such as in turbines and other types of jet engines, the gas may simply flow continuously through the STAR TUBE™ in conjunction with a continuously metered flow of fuel from the fuel nozzle of the jet engine. In this embodiment, and referring to FIG. 8, the fuel supply 250 is coupled to a fuel pump 252, which provides the jet fuel to a STAR TUBE™ 254 that may be configured generally as described for FIG. 1*b*, except the STAR TUBE™ construction is optimized for turbine and jet engines and constructed of materials consistent with jet engine design. Here, STAR TUBE™ 254 may be mounted in combustion chamber 256 generally where the fuel nozzle for the jet engine would be located. A small amount of compressor bleed air may be taken from the compressor portion 258 of the jet engine and applied through the STAR TUBE™ as a carrier gas a shown in FIG. 1*b*. In a jet engine having multiple fuel nozzles, there would be a STAR TUBE™ for each fuel nozzle. In some instances, a different source of compressed gas, such as ram air, may also be used. In addition, and as described above, a gas having beneficial or selected properties, such as nitrous oxide, may temporarily be used as all or some of the carrier gas to provide a temporary boost in power, or a gas that would temporarily reduce or eliminate pollution may be temporarily included in the carrier gas to promote more complete combustion in locations where pollution from a jet engine is a problem. In addition, certain liquids that would flash into a vapor upon being exposed to heat from the combustion chamber, such as alcohol, may be used to develop a carrier gas. Other gases or liquids, such as water, that may have beneficial properties may also be used, either continuously or on a temporary basis. Ideally, but not necessarily, the proportion of gas to fuel in a jet or turbine engine would be such that the fuel/air proportion is too rich to burn inside the STAR TUBE™ and would produce a dense fog of jet fuel that would burn more efficiently and completely than can be accomplished by current methods of jet fuel management in a jet engine. Also, it may be that an optimum droplet size may be different for jet or turbine engines than for sparked ignition engines. Here, droplet size may be adjusted for a jet or turbine engine by providing a larger STAR TUBE™ with more or fewer Star Spin and Shear plates and adjusting size of the central opening and slits. Such sizing of the Star plates and tubes is true for other engines and fuels. Here, smaller slits and more Star plates develops smaller fuel droplets, while larger slits and fewer plates produce larger droplets. Also, a rate of carrier gas flow through a STAR TUBE™ affects droplet size, with faster flow producing smaller droplets and slower flow producing larger droplets. FIG. 8*a* illustrates a STAR TUBE™ 254 installed in a jet engine wherein the STAR TUBE™ is closed to external carrier gas. Here, the fuel flows through a heater 260, which may be heated by combustion temperatures in the burn chamber 256 of the jet engine. So heated, a portion of the fuel flashes into vapor when applied to the STAR TUBE™, providing a carrier gas that processes the remainder of the liquid fuel passing through the STAR TUBE™.

By using STAR TUBEs™ in a jet engine to convert fuel into a fog, it should be apparent that the fuel may be controlled so as to produce more efficient and stoichiometric burning, in turn increasing efficiency, reducing pollutants and conserving fuel.

In yet other embodiments, such as in gasoline engines, it has been found that external carrier gas is unnecessary, with a motive flow of gas through the STAR TUBE™ provided by ambient gas or air within the STAR TUBE™, and by lighter components of the liquid fuel flashing into vapor. In these embodiments wherein no external carrier gases are provided, it has been found that lighter components of gasoline fuel flashing into vapor cools the environment within the STAR TUBE™ to between about 35-45 degrees Fahrenheit. As stated, this stabilizes the fuel fog. Also, vacuum developed by the engine assists in flashing the lighter components of the fuel into vapor. Here, as the spray of fuel is provided by the fuel injector, the associated piston begins its downward travel on the intake stroke, creating a partial vacuum in the intake manifold that is felt by the volume of air in the STAR TUBE™. As the partial vacuum increases due to the piston continuing its downward travel, air and fuel vapor, along with fuel droplets from the fuel injector, are drawn outward, pulling and processing the fuel droplets through the STAR TUBE™. After the intake valve closes, the partial vacuum dissipates, allowing air in the intake manifold to re-enter the STAR TUBE™. Of course, this action is in addition to any fuel vapor developed as described, and which contributes to carrier gas flow. This embodiment is useful in retrofit applications as only a closed STAR TUBE™ need be mounted between each fuel injector and its respective port. In all instances, the STAR TUBE™ and fuel injectors assemblies are mounted and supported by brackets or other similar structure (dashed lines in FIG. 1*a*), as should be apparent to one skilled in the art.

With reference again to FIG. 1*a*, and as described, a STAR TUBE™ 10 may be mounted in the throttle body or intake manifold 16 between a respective fuel injector and an associated injector port. Typically, the liquid fuel is pumped by low-pressure fuel pump 26 in a fuel tank to a high-pressure fuel pump 28, on the order of about 30 PSI or so, which conventionally develops fuel pressure and flow as shown to the fuel injectors 12. Injectors 12 produce bursts of fuel spray as controlled by an engine controller (not shown), which determines both duration and timing of the bursts of fuel. These bursts of fuel spray are fed directly into STAR TUBEs™ 10 where the fuel spray is processed into a fuel fog of smaller droplets of 50 microns and less in diameter, and subsequently fed into the throttle body, intake manifold or any other regions in which fuel would be appropriately injected. Induction air and the fuel fog as developed by the STAR TUBE™ is then drawn into a combustion chamber (not shown). The fuel feeding the fuel injectors may be conventionally regulated to a constant pressure by fuel pressure regulator 30, which relieves excess pressure by controllably bleeding high-pressure fuel via return line 32 to fuel tank 34 as shown by arrow 36, along with any vapor that has formed within the high-pressure feed line or fuel rail. Of course, and as stated, any of the devices shown and described for FIG. 1 may be substituted for the STAR TUBE™ 10, preferably within a closed environment communicating with the induction air flow.

FIG. 2 shows a cross section of one of STAR TUBEs™ 10. Initially, at an end B of the STAR TUBE™ that receives an injection end 38 of a fuel injector, a cap, as shown enlarged in FIG. 2*a*, or other closure 40 may be configured with an opening 41 that may be tapered to match a taper of fuel injection end 38. Positioned in cap 40 around injection end 38 are a plurality (9 shown) of openings O, which may be sized to handle air flow through the STAR TUBE™ for a particular engine. While a plurality of openings O are disclosed, other sizes and types of openings are also workable. For instance, as shown in FIG. 2*b*, a single, annular opening 37 around end 38 of fuel injector 12 may be provided, possibly out to the inner diameter of the STAR TUBE™, or a smaller number of openings O may be constructed in end B of the STAR TUBE™. Also as described, the openings may also be omitted, with the injector and cap sealed to form a closed end to the STAR TUBE™. In this embodiment, the volume of the interior of the STAR TUBE™ forms a gas and fuel vapor reservoir that provides a motive flow responsive to suction developed by a piston on its intake stroke, and the lighter components of fuel flashing into vapor. In some instances, the STAR TUBE™ diameter may be enlarged, or the length extended, so as to create a larger gas/vapor reservoir within the volume of the STAR TUBE™.

In the example of FIG. 2, a STAR TUBE™ constructed for use in a 350 cubic inch displacement engine is shown. In a popular, conventional version of this engine, there are four fuel injectors mounted in ports positioned directly in the airflow of a throttle body of the engine. As modified with STAR TUBEs™, the fuel injectors and STAR TUBEs™ are mounted and supported by brackets (schematically illustrated by dashed lines) so that there is a STAR TUBE™ mounted between each fuel injector and fuel injector port. It may be that the embodiments of the STAR TUBES™ that utilize a portion of the induction air flow as carrier gas perform better when mounted in a throttle body due to the fact that the low-pressure pulses developed by intake strokes of the pistons are attenuated because of the distance between the intake valves and the throttle body. In contrast, a closed STAR TUBE™ and associated fuel metering valve located proximate an intake valve may function well because the low-pressure pulse associated with an opening intake valve is more strongly felt by the liquid fuel/gas in the STAR TUBE™.

One STAR TUBE™ that has been found to work well for the aforementioned 350 cubic inch engine is shown in FIG. 2. In this embodiment, the tube portion 42 is about 1.5 inches outside diameter and about 1 inch inside diameter and about three to four inches long. Cap 40 is provided with a plurality (9 shown) of openings O around a periphery of the cap, these openings O each being about 0.187 inch in diameter. A central opening 44 in cap 40 is about 0.5 inch in diameter to receive the fuel injector end 38. In the instance where there is simply an opening in cap 40 around end 38 of the fuel injector, forming an annular opening, or where cap 40 is omitted entirely, the injector body would be supported exterior of the STAR TUBE™ so that end 38 is generally coaxially positioned with respect to the STAR TUBE™.

The region of the tube portion 42 immediately adjacent cap 40, which may be about 0.250 inches thick, may be tapered on an interior side over about a 0.5 inch length of the tube portion as shown in order to provide a clearance for openings O, and to provide a feeder region for fuel spray from the injector. Additionally, this taper somewhat compresses air flowing through openings O, thus advantageously speeding up velocity of air flowing through the STAR TUBE™. Alternately, the STAR TUBE™ may be constructed of thinner material. As such, the spray of fuel from the fuel injector is initially introduced into the STAR TUBE™ along with a flow of air. The flow of air and fuel droplet spray then encounters a plurality (5 shown) of turbulence-inducing devices, namely serially arranged Star Spin and Shear Plates 46 spaced about 0.75 inch from one another, with the closest star plate to the injector being spaced about 0.75 inch from the interior transition of the taper. As described, this volume, and to some extent the volumes between the Star Spin and Shear plates, forms a reservoir (in the absence of openings O) wherein air and fuel vapor in the STAR TUBE™ constitute carrier gas.

Figure 2:
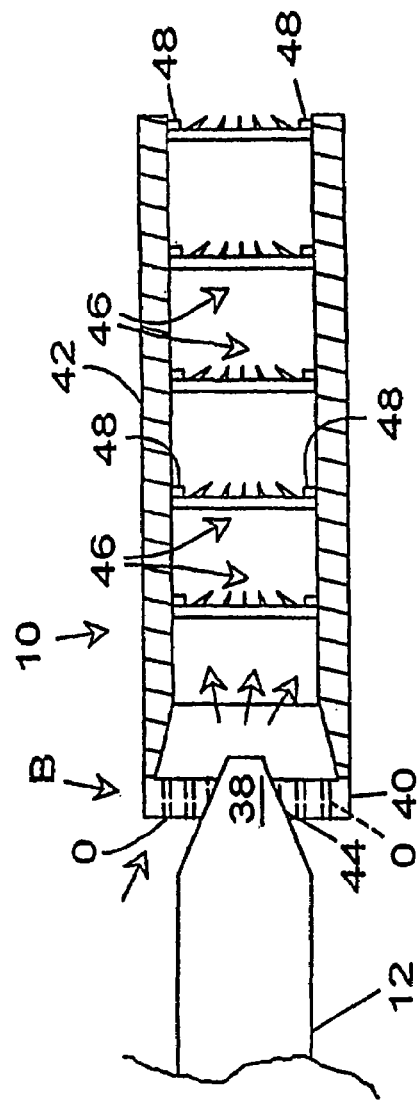
FIG. 2 is a cut-away view of one embodiment of a "STAR TUBE™" of the present invention.
Figure 1B:
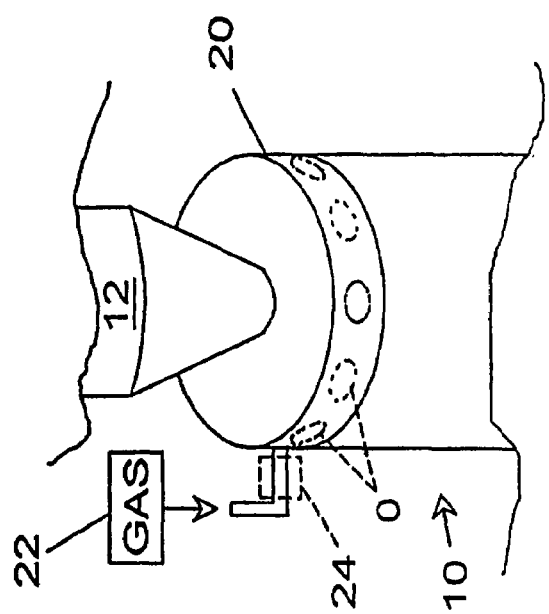
FIG. 1b is a diagrammatic view showing particulars of construction related to another embodiment of the present invention.

The Star plates may be mounted in the tube as by an interference fit between edges of each plate and an interior of a tube, by lips or supports constructed along an interior surface of the tube that the plates rest on, by bonding the plates within the tube, securing by fasteners, or any other obvious means for securing the plates within the tube, as represented by blocks 48 in FIG. 2. Further, in the event a plate inadvertently loosens within a STAR TUBE™, an end of the STAR TUBE™ closest to the intake manifold ports or throttle body port may be slightly narrowed or otherwise constructed so that the Star Spin and Shear plate is not drawn into the intake manifold.

Figure 3:
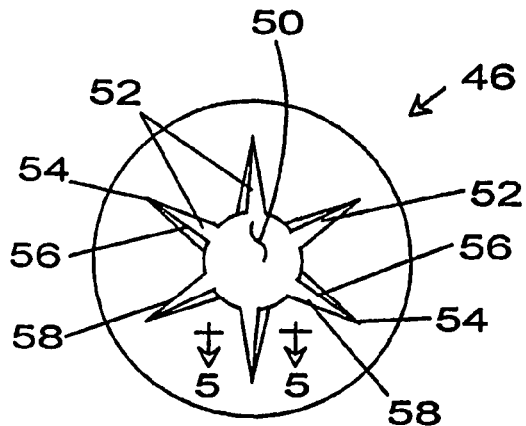
FIG. 3 is a top view of a Star Spin and Shear plate of the present invention.

The Star Spin and Shear plates 46 each have a plurality of types of openings (FIG. 3), these openings being a central opening 50 of about 0.5 inches in diameter and a plurality, in this instance 6, of narrowing spoke-like slits or openings 52 communicating with and radially extending from central opening 50. As shown in FIG. 3, openings 52 may be initially relatively wide at central opening 50, and converge with distance from central opening 50 to a point 54 radially positioned at approximately 50 percent to 85 percent or so of a diameter of the plates 46. A ratio of the diameter of plate 46 with respect to central opening 50 may be about 3 to 1, but a range of about 1.5 to 1 or so up to about 5 to 1 has been discovered to be workable.

Figure 4:
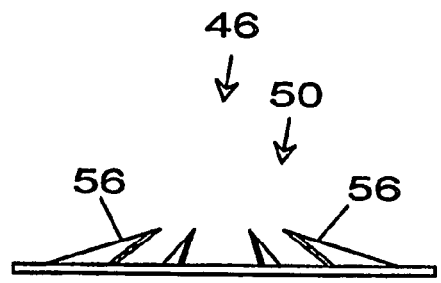
FIG. 4 is a side view of the Star Spin and-Shear Plate as shown in FIG. 3.
Figure 5:
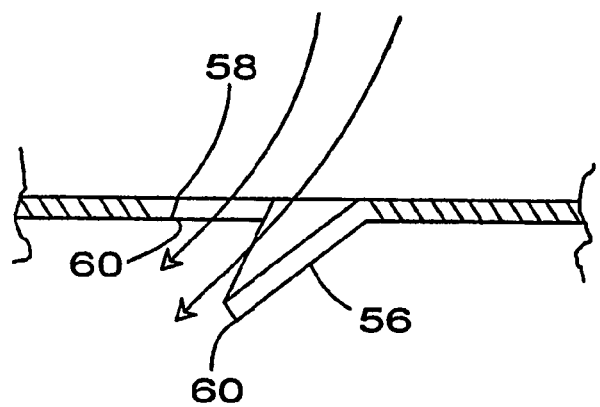
FIG. 5 is a cut-away view of a Star Spin and Shear plate illustrating particulars of operations.
Figure 2A:
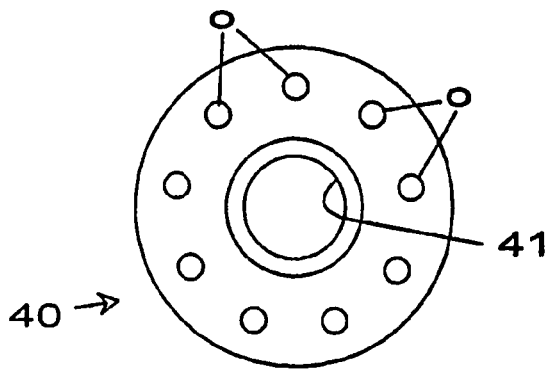
FIG. 2a is a view of an end of a STAR TUBE™ that receives a fuel injector.
Figure 2B:
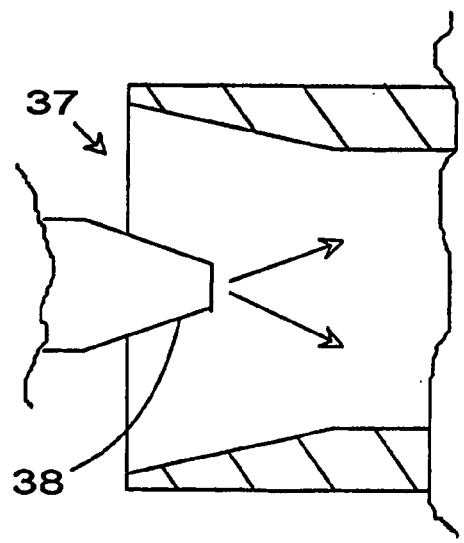
FIG. 2b is a cut-away view showing particulars of another embodiment of the invention.

As a feature of the invention, FIGS. 3-5 also illustrate a downwardly depending vane 56 positioned on edges of each of openings 52. Vanes 56 may be downwardly angled, as shown in FIGS. 4 and 5, at about from a few degrees to almost 90 degrees from a plane of the plate. However, in one contemplated embodiment that works well, a vane angle of about 40 degrees is used. Vanes 56, in conjunction with an opposed edge 58 of openings 52, serve to provide edges 60 (FIG. 5) that create turbulence when the airflow passes through a respective opening 52. This turbulence shears and breaks up larger fuel droplets into smaller droplets as the flow passes through successive star plates 46 until a desired droplet size of about 50 microns is reached. In addition, since all vanes 56 are oriented to direct airflow in the same direction, a net spin of the aerosol mix through the STAR TUBE™ is provided (clockwise in FIG. 3), causing larger fuel droplets to drift outward due to centrifugal force toward a perimeter of the STAR TUBE™, where they are forced to pass through a narrower portion of slits 52 where turbulence is greater. Here, this greater turbulence developed by the narrower regions of slits 52, in combination with sharp or abrupt edges 60, causes the larger fuel droplets to be broken up into smaller droplets. As such, smaller fuel droplets that are not as greatly affected by centrifugal force are prone to pass through portions of openings 52 closer to, or through central opening 50.

In addition, it has been found that the vanes may be angled either upward or downward, with approximately equal performance with respect to breaking up larger droplets into smaller droplets. Here, while the rotation imparted by downwardly extending vanes causes axial spin of fuel/air mixture through the STAR TUBE™, upwardly extending vanes also creates spin through the STAR TUBE™, in addition to the aforementioned shearing action around edges of openings 52.

While a Star Spin and Shear plate is disclosed, other configurations of plates with openings therein have been tested and have been found to work, albeit to a lesser extent but to an extent which may be practical. For instance, in one test the Star Spin and Shear plates were replaced with conventional flat washers having only a central opening. In this example, spin of the airflow was eliminated while providing relatively sharp or abrupt edges around central openings in the washers, these edges developing turbulence in the airflow. This embodiment worked about 40% as well as the Star Spin and Shear plates having vanes and radially extending slits. In another test, the Star Spin and Shear plates were replaced with TENON-type quick-connect nuts, which are configured similarly to the Star plates. These worked about 70-80 percent as well as the Star Spin and Shear plates. From this, it should be apparent that openings of any configuration in the plates may be used. This would include star-shaped openings, rectangular openings, square openings, or any other opening configuration. In addition, these openings may be alternated between successive plates so that a first plate may have one particularly configured opening and the next plate may have a differently configured opening, and so forth. In addition, it has been found that other types of washers and washer-like devices, such as star-type lock washers, which also have a similar configuration to a Star plate, work well. Another device that has been found to work to some extent is a disk or plate similar to a star-type lock washer except lacking a central opening. In this latter embodiment, fuel restriction was found to be a problem, but wider, outwardly extending radial slots or openings that terminate at a periphery of the plate may improve performance.

While 6 spoke-like slits 52 are shown in a Star Spin and Shear plate, more or fewer of these slits may be employed, such as about three or more. Likewise, while 5 star plates are shown and have been found to be optimal, fewer or more of these plates may be used, such as from about 1 or 2 to 7 or so. Also, the STAR TUBEs™ and Star plates may be scaled as necessary depending on displacement of the engine and number of fuel injector/STAR TUBE™ assemblies per cylinder. As stated, more plates and smaller openings and slits produce smaller droplets, with fewer plates and larger openings and slits producing larger droplets. Also, a greater rate of flow produces smaller droplets, while a slower rate of flow produces larger droplets.

As a primary function of a fuel injector is to provide a selected amount of fuel as determined by an engine controller, the fuel injector simply serves as a variable fuel metering valve responsive to the engine controller. As such, it may be possible to replace the fuel injector with a simple metering valve that provides the required amount of fuel, and generally as a spray or stream, to a STAR TUBE™ responsive to a signal from the engine controller, with the STAR TUBE™ breaking up the fuel into droplets of the predetermined size of about 50 microns and less.

It has been found that in the instance where a carrier gas is used, the carrier gas passing through all the STAR TUBEs™ of an engine may be up to a maximum of about five percent or so of the total induction airflow through the throttle body and intake manifold. In any Star Tube system, the process of breaking up the larger droplets may further be assisted or regulated by additives in the fuel to limit droplet breakup beyond a selected smallest size, such as 1-10 microns or so. Here, the additive may be selected so as to increase surface tension in the fuel droplets so that the smallest droplets of the fuel fog do not break up into yet smaller droplets. For instance, the addition of a small amount of heavier oil or fuel oil to gasoline, or addition of a small amount of glycerin or castor oil to alcohol, may increase surface tension or reduce volatility of the fuel so as to facilitate small droplet formation and minimize vapor formation.

As stated, when lighter fuels, such as gasoline, are initially sprayed into a STAR TUBE™ from a fuel injector or similar nozzle, more volatile components of the fuel are vaporized instantly due to being released from pressure in the fuel rail or fuel system, which may be about 30 PSI or so, and exposed to the vacuum pulse in the intake manifold adjacent an intake valve. This flashing into vapor saturates and cools the environment in the STAR TUBE™ so that further evaporation of the remaining heavier-component fuel droplets is prevented. Further, when drawn into the induction airflow, the volume of lighter-component fuel vapor containing the heavier-component fuel droplets forms a gas and vapor bolus of cool, hydrocarbon fuel-saturated air that stabilizes the heavier-component fuel droplets and prevents them from evaporating as they are drawn into a combustion chamber. Thus, in embodiments closed to an external source of carrier gas, a fuel charge for each intake stroke is made up of fuel droplets (50 microns and less) of the heavier-component fuel suspended in air partially saturated with cooled lighter-component fuel vapor. Such separation of the fuel into lighter-component vapor and heavier-component, size limited droplets may contribute to more efficient and faster burning of the fuel by causing faster propagation of the flame front through the fuel vapor/droplet/air mixture.

Several test engines have been adapted with Applicant's invention in order to test feasibility, practicality and workability of the STAR TUBEs™. For instance, one such engine was adapted as described above, and performed on a dynamometer as follows:

Engine:

A Chevrolet 350 CID engine bored out 0.030 to provide about 355 CID and a Compression Ratio of about 10.6:1.

Total runs done: more than 160.

4 STAR TUBEs™: (Step Diffuser plates enhanced by Star spin) mounted in a throttle body, Six Star spoked openings, base to base: ¾ in.

Peak anti-detonation effect in this engine was found with 5 to 7 Star plates. With more than 7 plates, power began to drop, probably because of fuel restriction. With 3 plates, the effect was still about 80% of what it was with 5 plates. In this engine;

Star plate OD: 15/16 in.

Tube ID: 13/16 in.

Tube OD: 1¼ in.

Tube length about four inches Smaller sized Star plates and tubes still produced an effect but with a proportional reduction in engine power. Sizing of the Star plates may therefore be a function of air-flow (almost akin to engine size) through the engine. Considerable latitude appears to exist, but larger area Star plates work better with larger displacement engines, and vice versa. As a general rule, the STAR TUBEs™ work well when they receive about 5% of the total induction airflow through the throttle body. The opening or openings in cap 12 around the fuel injector tip are generally sized to allow little restriction of carrier gas flow through the tube. Typically, engine runs were from 5000 rpm down to 2500 rpm, with data readings taken by conventional engine monitoring equipment.

Engine measurements were taken at every 250 rpm from between 1500 rpm up to about 4500 rpm. Critical detonation data typically comes in between 3000 and 3500 rpm. Peak torque typically comes in between 3000 and 4000 rpm. Spark advance was set for best torque (without detonation, if any). With C-12 (108 octane racing fuel used to establish a baseline), there was never any detonation regardless of the amount of spark advance (this did not exceed 36 degrees). Using a gasoline with an octane rating of about 80, peak torque with the STAR TUBEs™ was typically at about 30 degrees spark advance with no knock. Peak torque was always equal to or better with STAR TUBES™ and 80 octane gasoline than peak torque with C-12 and conventional fuel injectors. The lesser spark advance used to obtain peak torque with the STAR TUBES™ is indicative that the 80 octane fuel fog burns faster than the C-12. Further, it has been found that utilizing STAR TUBEs™ and 80 octane gasoline, with the spark advance set for peak torque at 28-30 degrees spark advance, exhaust gases are cooler, indicating that more available power is converted to mechanical energy, and not wasted as heat.

In an aviation context, a ROTORWAY™ helicopter engine in a helicopter was modified with STAR TUBEs™ and extensively tested. In this embodiment of the STAR TUBEs™, the tubes were similar to the ones used in the Chevrolet™ engine as described, except were closed to any external carrier gas. The gasoline feed region of the STAR TUBE™ serves as a gas/vapor reservoir. The ROTORWAY™ engine is a fuel-injected aviation engine rated at 145 horsepower, with a fuel injector for each cylinder of the engine, each fuel injector injection tip mounted in a fuel injector port located just upstream a respective intake valve. The fuel injectors were removed, and a STAR TUBE™ mounted in each fuel injector port. The fuel injector was then mounted at the other end of the STAR TUBE™, and as stated, closed to any external source of carrier gas so that there was a small air reservoir approximately ¾"-1" or so between the fuel injector tip and the first Star plate. In full power dynamometer tests, the ROTORWAY engine equipped with STAR TUBEs™ produced over 200 horsepower, as opposed to 145 horsepower for a full power test of the conventional version of the engine. In a 30 minute hover test, the ROTORWAY helicopter equipped with STAR TUBEs™ used slightly under three gallons of gasoline at a ⅓ power throttle setting, as compared to the same helicopter without STAR TUBEs™ which used four gallons of gasoline at a ⅔ power throttle setting in the same 30 minute hover test. Clearly, the embodiment of STAR TUBEs™ closed to any external carrier gas, at least with respect to the ROTORWAY engine, provides about 25 percent increase in power and efficiency.

The STAR TUBE™ of the instant invention may also work with certain Diesel or Diesel-type engines wherein the fuel is ignited by compression. In this instance, and referring to FIG. 6, a cut-away, diagrammatic view of a Diesel cylinder and combustion chamber 60 are shown. In this particular type of Diesel engine, a swirl chamber 62 is conventionally provided in a head portion 64 of the combustion chamber, and a swirl cutout 66 is conventionally provided in a piston 68. A passageway 70 communicates between swirl chamber 62 and combustion chamber 72. A fuel injector 74 is mounted so as to inject fuel into swirl chamber 62, with a STAR TUBE™ 76 of the present invention mounted in passageway 70 so as to receive fuel from injector 74 and convey a fuel fog to combustion chamber 72. It is to be noted that the STAR TUBE™ 76 is sized so as not to completely fill passageway 70, thus allowing some of the combustion air to bypass STAR TUBE™ 76. As stated, the dimensions of the Star plates and STAR TUBEs™ for a Diesel engine may be adjusted to obtain a different particle size if a particle size other than less than 50 microns is found to be optimal.

Figure 6:
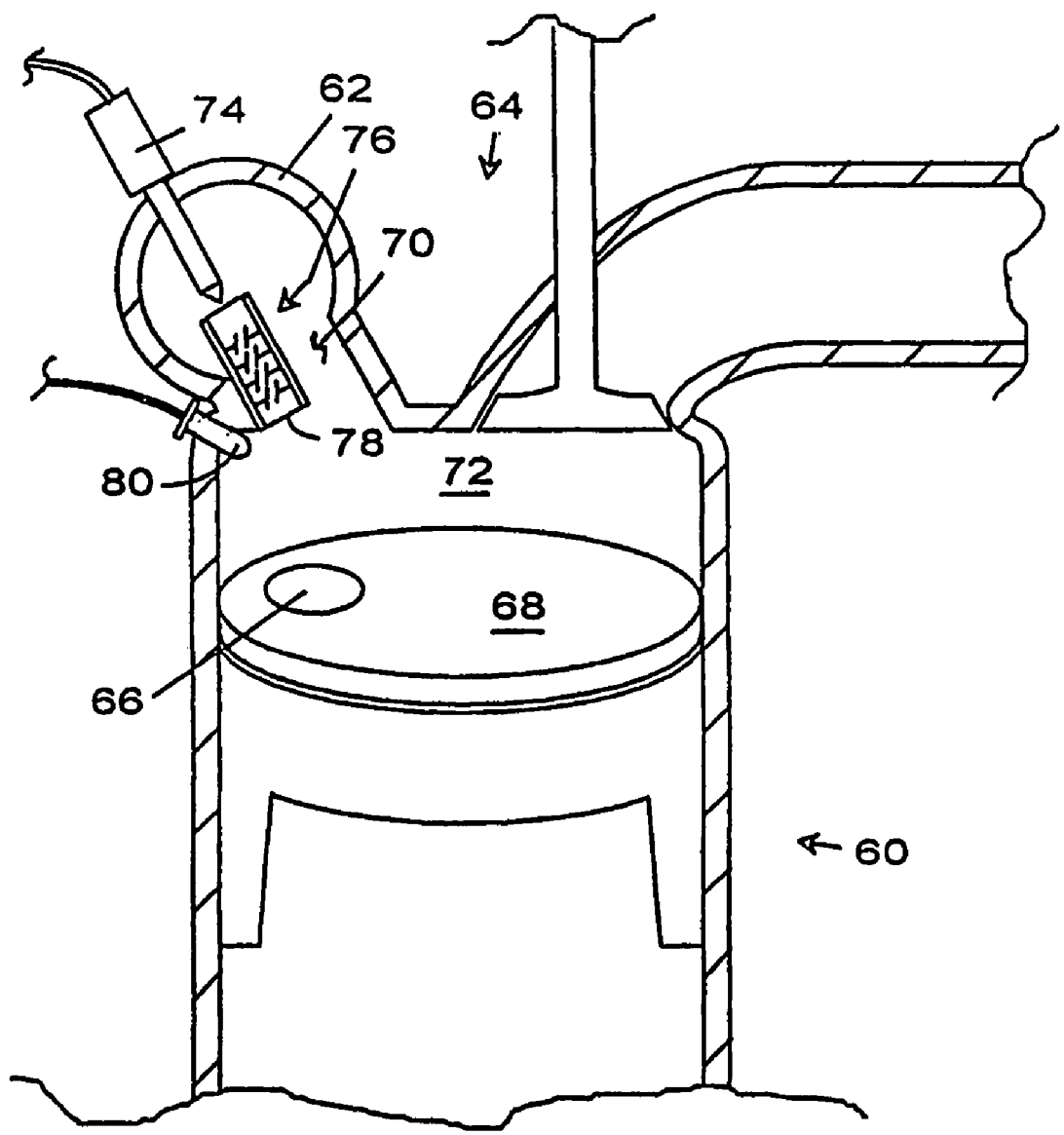
FIG. 6 is a cut-away, diagrammatic view of a cylinder and combustion chamber of a Diesel engine fitted with a STAR TUBE™ of the instant invention.

Operation of the embodiment of FIG. 6 is as follows. During the compression stroke, essentially all of the combustion air is compressed into the swirl chamber. At the appropriate time, which is typically 2 degrees or so before top dead center for a Diesel engine, fuel is injected into the STAR TUBE™. At the beginning of the fuel injection, it is believed a small combustion burn occurs in the STAR TUBE™, depleting the tube of oxygen and allowing the remainder of the fuel to be sprayed into the STAR TUBE™. The remainder of the fuel is processed by the STAR TUBE™ as described above, with some of the gas from the swirl chamber passing through the STAR TUBE™ and the fuel fog ejected from the STAR TUBE™ and burned in the air bypassing the STAR TUBE™ via passageway 70. When cold, the engine may be started by means of a conventional glow plug 80 positioned below STAR TUBE™ 76.

Figure 7:
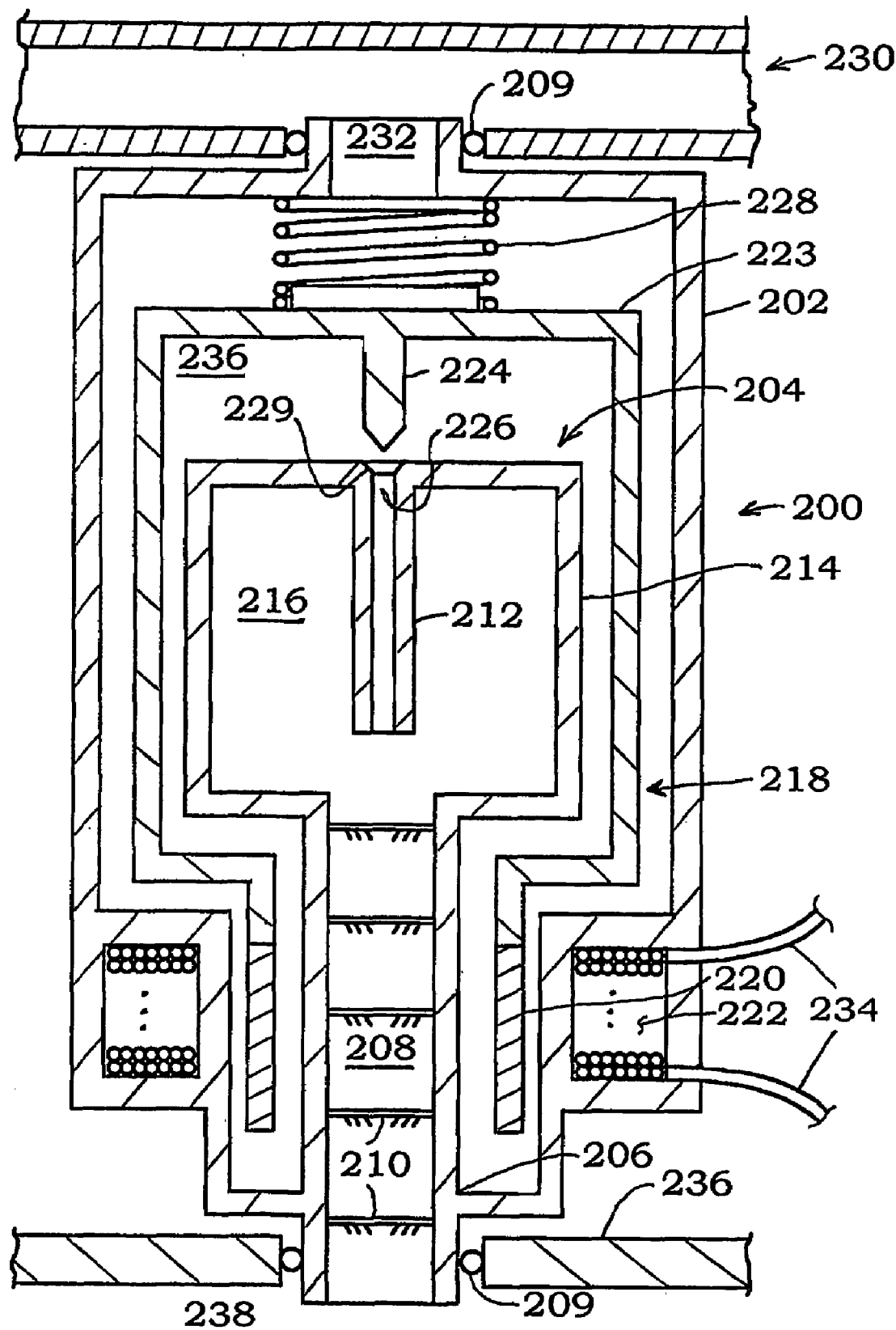
FIG. 7 is an embodiment of the invention integrating a STAR TUBE™, air reservoir and a fuel metering valve into a single, integral unit.

In yet other embodiments that may be particularly applicable to gasoline or other sparked ignition engines, and referring to FIG. 7 by way of example, a combined fuel injector or fuel nozzle and STAR TUBE form an integral assembly 200 that is more compact in length than a sealed fuel injector and STAR TUBE™ combined as described above. This is accomplished by moving the fuel nozzle or other fuel-supplying orifice 212 up into assembly 200 to a point near a fuel rail 230. A STAR TUBE™ 208 is mounted to receive, at one end, fuel from the fuel port or nozzle 212, with the other end of the STAR TUBE™ configured to be mountable into a fuel injector port 238 of an intake manifold or throttle body 236. The assembly 200 is conventionally sealed at fuel rail 230 and at port 238, as by O-rings 209. Significantly, to provide a motive flow of gas through the STAR TUBE, an air/vapor reservoir 216 may be provided and which is sealably coupled to a top of STAR TUBE™ 208, with nozzle or tube 212 extending as shown therethrough to a point near an entrance of the STAR TUBE™. In other embodiments, tube 212 and the reservoir 216 may be shortened or omitted entirely in order to shorten the assembly 200, with fuel provided directly from the metering valve into the STAR TUBE™. Such an embodiment may be used in conjunction with heating the fuel to develop vapor that serves as a carrier gas, as will be further explained.

The assembly 200 is provided with an outer hollow housing 202 having a port 232, which as stated sealably communicates with fuel rail 230, with the combined fuel valve and STAR TUBE™ assembly 204 mounted in housing 202. Housing 202 may be constructed to internally and rigidly support assembly 204 at an interface region 206, although other internal mounting arrangements may be implemented, as should be apparent from Applicant's disclosure to one skilled in the art. An armature assembly 218 is provided between housing 202 and assembly 204, and is provided with a magnet portion 220 that reacts against a magnetic field developed by solenoid 222. Thus, armature assembly 218 is raised and lowered responsive to control current applied to solenoid 222. Also attached to an upper portion 223 of armature 218 is a needle portion 224 of a needle valve, which is mounted so as to release a flow of fuel through an entrance 226 of nozzle 212 when the armature is raised. A spring 228 biases armature 218 downward, pressing needle 224 against a needle valve seat 229 at entrance 226 until the armature is lifted by an energizing current pulse provided to solenoid 222. Vertical or other guides (not shown) may be incorporated on armature 218 and on interior surfaces of housing 202 so that needle 224 is maintained in a precise position with respect to seat 229 as the armature is actuated up and down. As stated, fuel rail 230 provides fuel to the interior of housing 202 via opening 232, from which pressurized fuel flows to opening 226. For reducing hydrostatic resistance as the armature is moved up and down, the armature may be provided with openings, or be constructed as a cage-like structure, as should be apparent from Applicant's disclosure to those skilled in the art. Further, the skirt of the armature may be shortened so as to extend barely over the reservoir, reducing its mass. In this instance, the coil 222 would be appropriately positioned. As should be apparent from Applicant's disclosure, the armature and fuel valve may take many forms, the primary feature being that of a fuel metering valve constructed in conjunction with a STAR TUBE™, with or without an air reservoir, and all as a single, integral, compact unit.

In operation, and as stated, pulses of appropriately poled current flow, which may be on the order of about 1-15 milliseconds or so, depending on the fuel demand to the engine, are applied to solenoid 222. Responsive to these pulses, armature 218 is lifted against the bias of spring 228, releasing fuel through opening 226 for a duration approximately equivalent to the duration of each pulse. Just before or concurrently with each pulse, an intake valve in the engine opens and an associated piston begins downward travel of the intake stroke, creating a temporary vacuum pulse in the intake manifold. This temporary vacuum pulse causes air in air reservoir 216 (when provided) to rush downward through the STAR TUBE™ and out port 238. In addition, such a temporary vacuum pulse in combination with pressure in the fuel rail assists in vaporizing lighter components of the fuel, which develops more carrier gas and vapor and cools and saturates air in the STAR TUBE™ as described above. Fuel droplets from nozzle 212 are carried along with the rush of air along with the lighter, vaporized components of the fuel from reservoir 126 and processed as described above by Star plates 210. After the intake valve closes, the partial vacuum pulse is eliminated and air fills the Star TUBE™. Thus, in this embodiment, an external supply of gas or air need not be provided to the STAR TUBE™, and the entire assembly 200 may be constructed in a more compact form, possibly a short as the length of a conventional fuel injector. In these embodiments that do not use an external carrier gas, it may be that after a short period of operation, and particularly at higher RPM's of the engine, reservoir 216 becomes filled with fuel vapor that may simply oscillate back and forth on each stroke of the engine, with all the fuel vapor never really clearing the reservoir. In this instance, the lighter-component, fuel saturated environment in the reservoir assists in preventing further evaporation of the heavier-component fuel droplets. Of course, as the lighter fuel components flash into vapor when released from pressure in the fuel rail, the newly formed fuel vapor displaces any fuel vapor remaining in the STAR TUBE™ along with the heavier-component droplets.

Figure 7A:
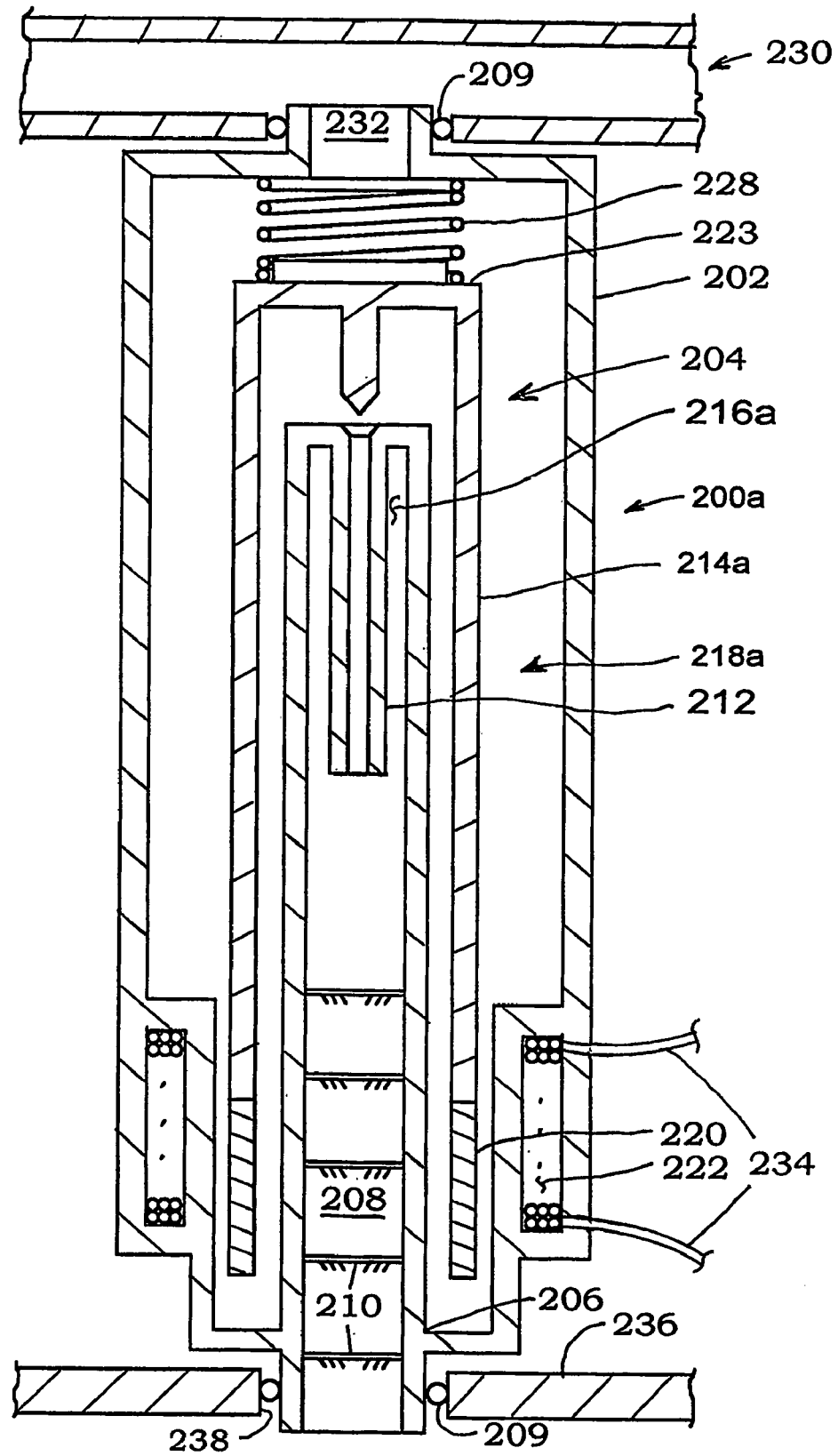
FIG. 7a is another embodiment of the invention integrating a STAR TUBE™, a smaller air reservoir and a fuel metering system into a single integral unit.
Figure 7B:
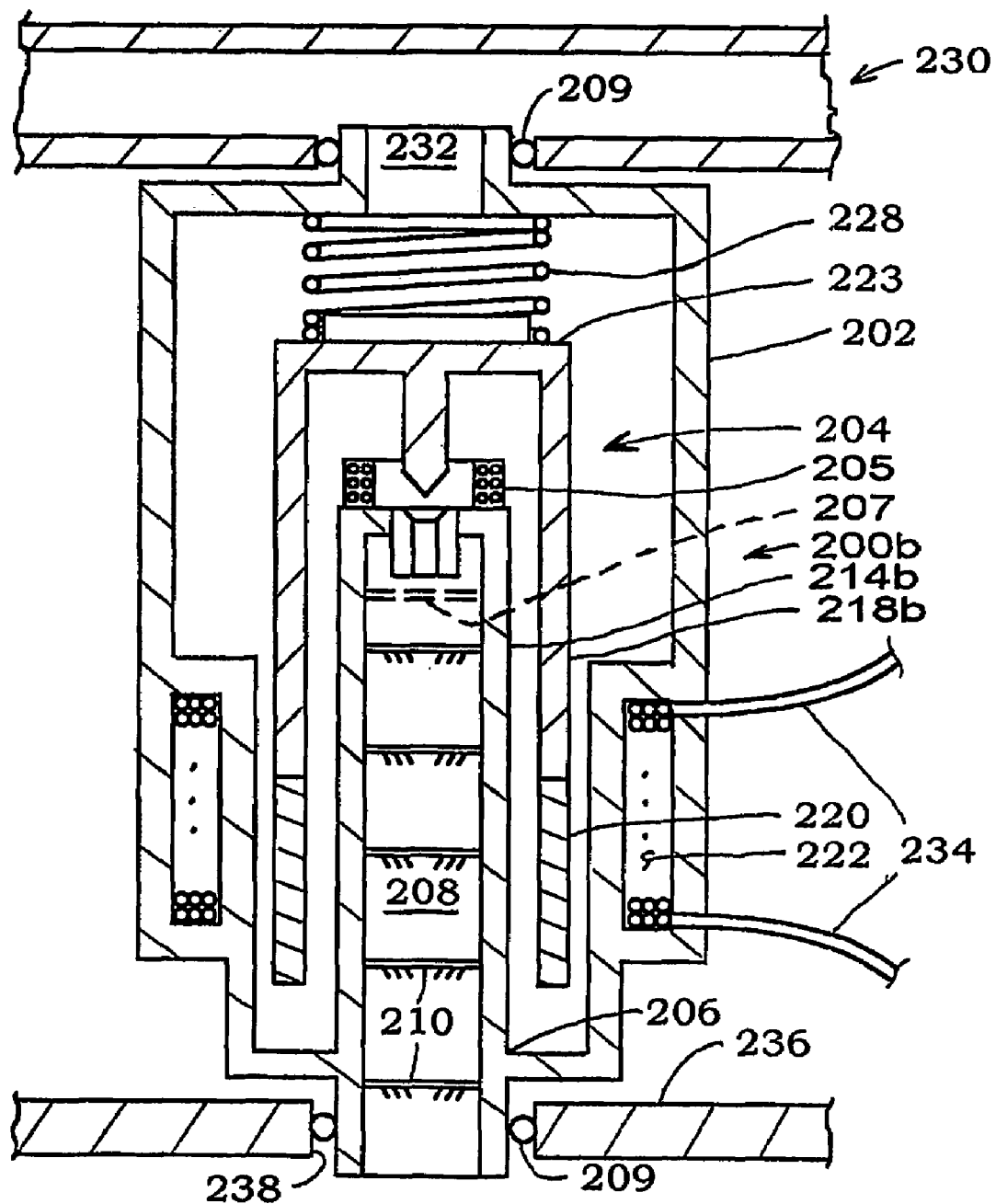
FIG. 7b is yet another embodiment of the invention integrating a STAR TUBE™ and a fuel metering valve into a single integral unit without a discrete air reservoir, with carrier gas supplied from the volume of air and gas within the STAR TUBE™.
Figure 8:
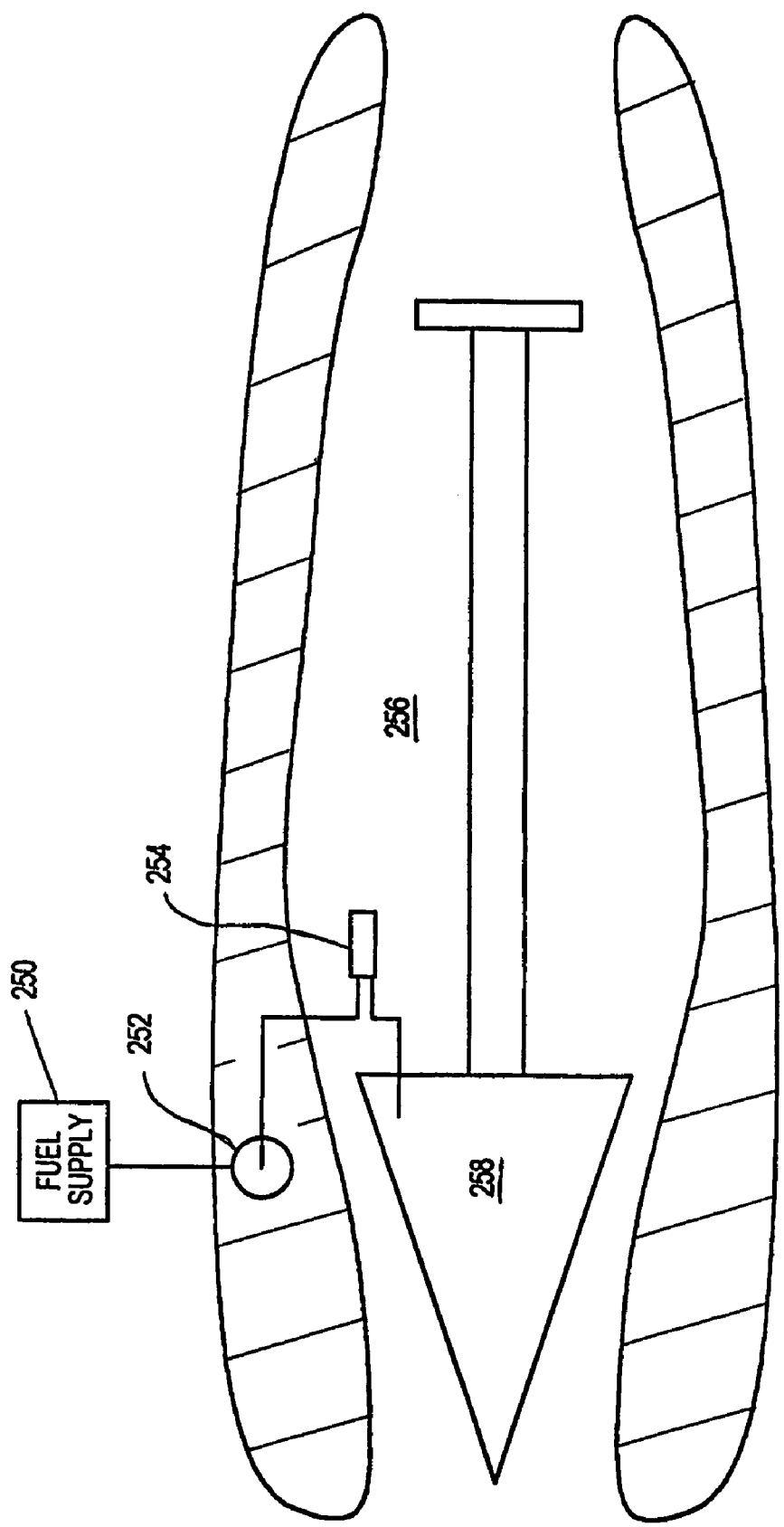
FIG. 8 is a diagrammatic illustration of how a STAR TUBE™ may be fitted to a jet engine.
Figure 8A:
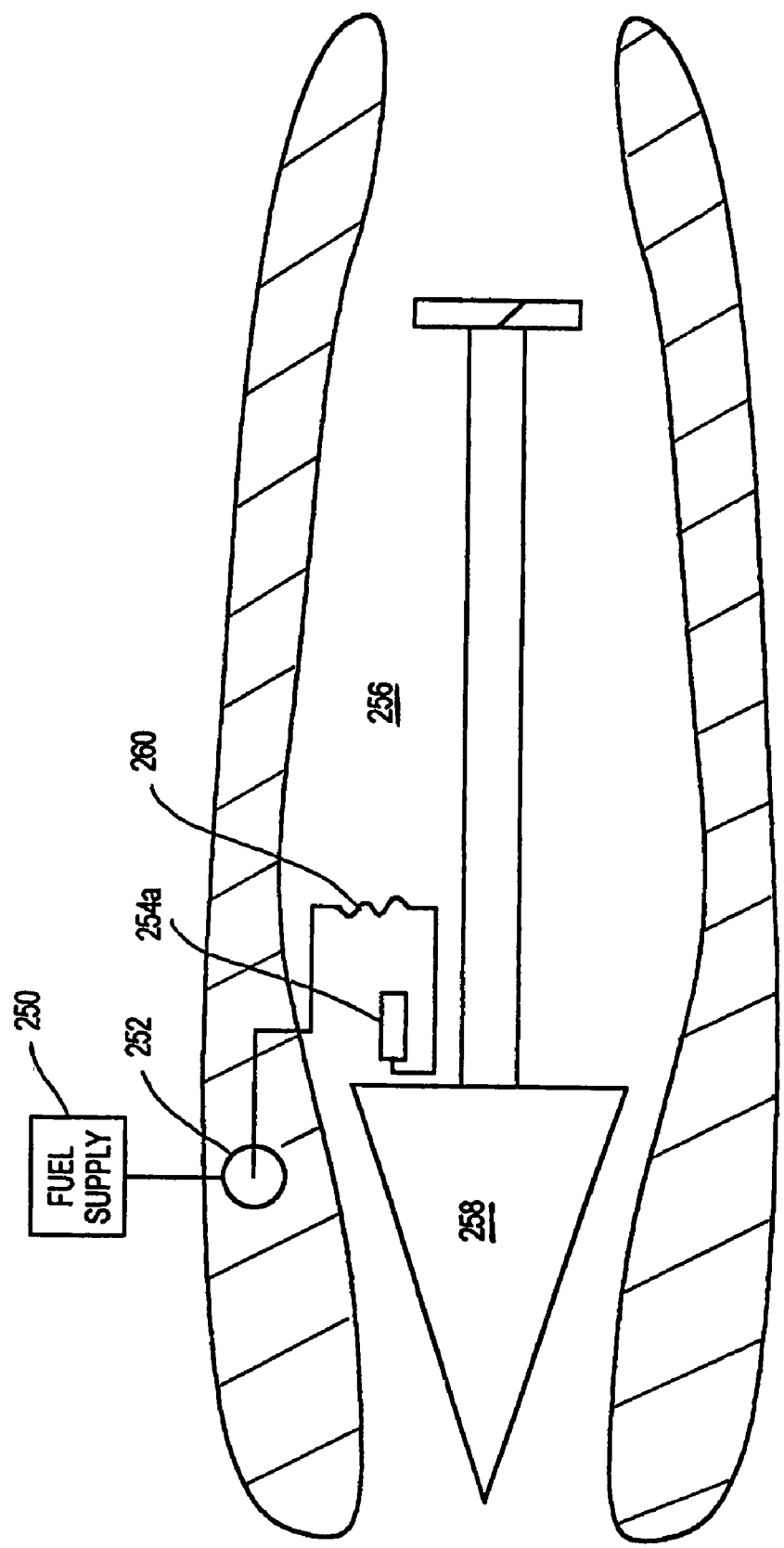
FIG. 8a is a diagrammatic illustration of another way a STAR TUBE™ may be fitted to a jet engine.

FIGS. 7a and 7b each show an integral device similar to that of FIG. 7, except that in FIG. 7a the reservoir is narrower and in-line with the STAR TUBE. In FIG. 7b, there is only a very small or no reservoir, the STAR TUBE™ being directly below a fuel valve. This embodiment is functionally the same as was tested in the ROTORWAY™ helicopter. In addition to the designs described herein, it should be apparent from Applicant's disclosure to one skilled in the art that the combined fuel nozzle/STAR TUBE™ may take many forms. For example, a fuel-dispensing tube may extend generally perpendicular into the STAR TUBE™, or at an angle over the top of the STAR TUBE™, to inject liquid fuel at a point just over the first Star Plate. The closed gas/vapor reservoir over the top of the STAR TUBE™ would provide carrier gas and vapor as described on the intake stroke, or the fuel may be heated to flash some of the fuel into a vapor to provide carrier gas. Also, a fuel injector nozzle may be mounted adjacent a top of the STAR TUBE™ to dispense fuel into a top of the STAR TUBE™ and in a direction generally perpendicular to the STAR TUBE™. In this embodiment, the fuel injector portion may be fabricated alongside the STAR TUBE™ so the assembly would be wider and shorter than the embodiments of FIGS. 7, 7a and 7b. Of course, in these embodiments a tube or nozzle may also be extended to direct fuel approximately coaxially into the STAR TUBE™.

Also shown in FIG. 7b, and by way of example, is a small heater or heating element 205 located or mounted to an exterior upper region of assembly 204 so as to heat liquid fuel just prior to the fuel passing through the needle valve. This or a similar embodiment may be used in cold environments where less fuel flashes into vapor that otherwise would reduce carrier gas flow through the STAR TUBE™. Here, such an embodiment may be useful in an aviation context where a heater such as heater 205 may be used continuously at a colder, higher altitude, and switched OFF at lower, warmer altitudes. Of course, such a heater may be used in a ground vehicle travelling between cold and warm climates. Also, such a heater may initially be used when starting a cold engine in order to develop more carrier gas/vapor, which in turn causes more flow through the STAR TUBE™ that breaks cold liquid fuel into smaller droplets that are easier to ignite. As noted above, when cold engines are started, relatively large amounts of pollution are produced due to poor combustion properties of cold fuel in a cold engine. Additionally, such heating of the fuel may be beneficial in engines fueled by heavier fuels that do not readily flash into vapor, such as jet fuel, in order to cause more of the fuel to flash into vapor or otherwise cause the fuel to be easier to ignite. In this embodiment, the fuel may be heated continuously, or heated only as needed to effect faster burning of fuel with little or no pollutant generation.

While a heater is shown within the assembly 200 of FIG. 7b, it should be apparent from Applicant's disclosure to one skilled in the art that several embodiments that include heating of the fuel may be implemented. For instance, the entire assembly 200 may be insulated and heated as by wrapping an external heating element around the assembly, or the fuel may be heated in the fuel rail or in a connecting region between the fuel rail and assembly 200. Alternately, the larger volume of fuel within assembly 200 may be heated, as by providing a heating element near solenoid 222, or a heating element may be incorporated in solenoid 222. In addition, tube 212 may be heated to flash a portion of the fuel into vapor to develop carrier gas, or the STAR TUBE™ portion itself may be heated to flash a portion of the fuel to vapor. Alternately, as shown by dashed lines in FIG. 7b, some or all the fuel may be sprayed directly from the fuel metering valve directly onto a heated screen, perforated plate or similar heater 207 to evaporate a portion of the fuel to develop carrier gas just prior to processing a remainder of the liquid fuel through the STAR TUBE™.

Other, more volatile fuels than gasoline may also be used in conjunction with a STAR TUBE™ system. For example, cryogenic fuels such as liquefied propane or liquefied natural gas, and possibly hydrogen, may be used. Here, a step down liquid-to-liquid regulator may be used so that the output pressure of the fuel may be regulated to about 40 psi or so, with the fuel lines carrying this lower pressure being thermally insulated so that the lower-pressure fuel is maintained in a chilled and liquid state. Any vapor developed in the fuel lines may be returned to the tank. In this instance, a standard fuel injector or similar metering valve may be used to dispense the chilled liquid fuel. Operation would be the same as with gasoline, with a portion of the liquid fuel flashing into vapor, saturating the environment of the STAR TUBE™ with hydrocarbon gas and further cooling the fog of droplets, stabilizing the droplets and retarding further evaporation of the droplets until they are burned.

As should be apparent from Applicant's disclosure, there are many ways in which an integral unit containing a STAR TUBE™ and fuel injector or fuel valve, or other droplet generator such as those earlier described, may be configured, either with or without a discrete air/gas reservoir. Also, the size of the reservoir and distance between the Star plates may be adjusted to a set size and distance so as to take advantage of a particular RPM range of an engine, or may be adjustable "on the fly" so as to be adjustable throughout an engine's RPM range in order to assist or facilitate broadening a power band of the engine. Such variations or adjustment of the reservoir size and/or distance between the Star plates may be in accordance with harmonics or resonance of the air column within the star tube, and possibly in conjunction with resonance of the reservoir, to make gas flow through the star tube more efficient, enhance fuel flow or to increase or decrease gas pressure spikes in the STAR TUBE™ and reservoir (where used). Such tuning would generally be similar to tuning of exhaust systems in order to make air flow through the engine more efficient.

Having thus described my invention and the manner of its use, it should be apparent to those skilled in the arts to which my invention pertains that incidental changes may be made thereto that fairly fall within the scope of the following appended claims, wherein I claim:

The invention claimed is:

1. A liquid fuel delivery system for delivering liquid fuel to apparatus for utilizing energy produced from burning said liquid fuel, said liquid fuel delivery system comprising:
   a source of said liquid fuel,
   a liquid fuel metering device coupled to said source of said liquid fuel and providing metered quantities of said liquid fuel,
   a closed liquid fuel fog-producing device coupled to said liquid fuel metering device and receiving said metered quantities of said liquid fuel, said liquid fuel metering device and said liquid fog-producing device being sealed against any external source of gas, said liquid fuel fog-producing device configured to process said metered quantities of said liquid fuel into a fog of fuel droplets of a maximum predetermined size and provide said fog of fuel droplets of a maximum predetermined size to said apparatus.

2. A liquid fuel delivery system as set forth in claim 1 wherein said predetermined maximum size of said fuel droplets is about 50 microns in diameter, with the fuel droplets being predominantly in a range of from about 10 microns to about 30 microns.

3. A liquid fuel delivery system as set forth in claim 2 wherein said liquid fuel metering device and said closed liquid fuel fog-producing device are incorporated into a single, unitary housing communicating with an induction flow of said apparatus.

4. A liquid fuel delivery system as set forth in claim 2 wherein said liquid fuel metering device and said liquid fuel fog-producing device are separate, discrete components sealed against any external source of gas.

5. A liquid fuel delivery system as set forth in claim 3 wherein said liquid fuel fog-producing device comprises a tube having a plurality of turbulence-inducing devices therein.

6. A liquid fuel delivery system as set forth in claim 5 wherein each turbulence-inducing device of said turbulence-inducing devices comprises a disk having a central opening.

7. A liquid fuel delivery system as set forth in claim 6 wherein each said disk further comprises slits extending away from said central opening.

8. A liquid fuel delivery system as set fort in claim 6 further comprising a gas reservoir communicating with said tube.

9. A liquid fuel delivery system as set forth in claim 8 wherein said liquid fuel is injected into an end of said tube communicating with said gas reservoir.

10. A liquid fuel delivery system as set forth in claim 6 further comprising a liquid fuel heater that causes a portion of the liquid fuel to flash into vapor when released from said liquid fuel metering device.

11. A liquid fuel delivery system as set forth in claim 2 wherein said liquid fuel metering device and said liquid fuel fog-producing device are part of a gasoline engine.

12. A liquid fuel delivery system as set forth in claim 2 wherein said liquid fuel metering device and said liquid fuel fog-producing device are part of a turbine or jet engine.

13. A liquid fuel processing and delivery apparatus used in combination with an internal combustion engine comprising:

at least one combustion region for said internal combustion engine, an induction air flow for said at least one combustion region of said internal combustion engine, a source of said liquid fuel, at least one liquid fuel metering device coupled to said source of said liquid fuel, said liquid fuel metering device delivering metered quantities of said liquid fuel in a close stoichiometric relationship with said induction airflow for said at least one combustion region, a liquid fuel, size limited droplet-producing device coupled to receive said metered quantities of said liquid fuel and deliver a stabilized fog of liquid fuel droplets having a maximum predetermined size to said induction airflow, a housing sealed against any external source of gas and enclosing said fuel metering device and said liquid fuel, size limited droplet-producing device, incorporating said liquid fuel metering device and said liquid fuel, size limited droplet-producing device into a single, discrete component, whereby when said stabilized fog of liquid fuel droplets having a maximum predetermined size are ignited in said combustion region, said liquid fuel droplets burn completely within said close stoichiometric relationship.

14. A liquid fuel processing and delivery apparatus as set forth in claim 13 wherein said liquid fuel, size limited droplet-producing device produces liquid fuel droplets of less than about 50 microns in diameter.

15. A liquid fuel processing and delivery apparatus as set forth in claim 13 wherein said liquid fuel, size limited droplet-producing device produces liquid fuel droplets predominantly within a range of about 10-30 microns in diameter.

16. A liquid fuel processing and delivery apparatus as set forth in claim 13 wherein said fog of liquid fuel droplets is cooled by evaporation of some of said liquid fuel to effect stabilization thereof.

17. A liquid fuel processing and delivery apparatus as set forth in claim 13 wherein said liquid fuel, size limited droplet-producing device further comprises a tube containing at least one turbulence-inducing device, said tube receiving said metered quantities of said liquid fuel at one end and providing said stabilized fog of liquid fuel droplets of a maximum predetermined size from an opposite end.

18. A liquid fuel processing and delivery apparatus as set forth in claim 17 wherein said one end of said tube receiving said metered quantities of said liquid fuel is provided with a gas reservoir.

19. A liquid fuel processing and delivery apparatus as set forth in claim 18 wherein said gas reservoir and said one end of said tube are closed to external gases.

20. A liquid fuel processing and delivery apparatus as set forth in claim 17 wherein said turbulence-inducing device further comprises a disk having an opening generally located in a center of said disk.

21. A liquid fuel processing and delivery apparatus as set forth in claim 20 wherein said disk has a plurality of slits extending away from said opening.

22. A liquid fuel processing and delivery apparatus as set forth in claim 21 wherein edges of said disk forming said slits are configured to angularly direct gas flow through said slits so that said gas flow and said droplets spiral through said tube.

23. A liquid fuel processing and delivery apparatus as set forth in claim 14 further comprising a fuel heater for heating said liquid fuel whereby a portion of heated said liquid fuel flashes into vapor when released by said fuel metering device.

24. A fuel delivery system for an internal combustion engine having an engine controller for controlling a flow of liquid fuel in accordance with induction airflow and comprising:

a pressurized supply of liquid fuel, at least one fuel metering and processing apparatus further comprising:

a housing coupled to said pressurized supply of liquid fuel, a liquid fuel metering device within said housing and responsive to said engine controller to provide metered quantities of said liquid fuel in a close stoichiometric relationship with said induction airflow, a liquid fuel fog-producing device in said housing, said liquid fuel fog-producing device receiving said metered quantities of said liquid fuel from said liquid fuel metering device, and processing said metered quantities of said liquid fuel into a fog of liquid fuel droplets of a maximum predetermined size, said fog of liquid fuel droplets provided to said induction airflow.

25. A fuel delivery system as set forth in claim 24 wherein said maximum predetermined size of said liquid fuel droplets is about 50 microns, with said fuel droplets in said fog of liquid fuel droplets being sized predominately in a range of from about 10 microns to about 30 microns.

26. A fuel delivery system as set forth in claim 25 wherein said liquid fuel fog-producing device comprises a tube containing at least one turbulence-inducing device, said tube receiving said metered quantities of said liquid fuel at one end thereof and providing said fog of liquid fuel droplets of a maximum predetermined size to said induction airflow from an opposite end thereof.

27. A system as set forth in claim 26 wherein said tube is configured having a carrier gas reservoir within which said metered quantities of said liquid fuel are provided.

28. A fuel delivery system as set forth in claim 27 further comprising a fuel heater for heating said liquid fuel.

29. A fuel delivery system as set forth in claim 28 wherein said fuel heater is operated intermittently.

30. A fuel delivery system as set forth in claim 28 wherein said fuel heater is operated continuously.

* * * * *